(12) United States Patent
Maleck et al.

(10) Patent No.: US 11,078,604 B2
(45) Date of Patent: Aug. 3, 2021

(54) METHOD FOR OPERATING A TEXTILE MACHINE, AND TEXTILE MACHINE

(71) Applicant: Maschinenfabrik Rieter AG, Winterthur (CH)

(72) Inventors: Mario Maleck, Walting (DE); Robin Wein, Manching (DE)

(73) Assignee: Maschinenfabrik Rieter AG, Winterthur (CH)

( * ) Notice: Subject to any disclaimer, the term of this patent is extended or adjusted under 35 U.S.C. 154(b) by 145 days.

(21) Appl. No.: 16/425,241

(22) Filed: May 29, 2019

(65) Prior Publication Data
US 2019/0368077 A1   Dec. 5, 2019

(30) Foreign Application Priority Data
May 29, 2018   (DE) .................... 10 2018 112 802.9

(51) Int. Cl.
*D01H 4/02*   (2006.01)
*D01H 1/115*   (2006.01)

(52) U.S. Cl.
CPC .............. *D01H 4/02* (2013.01); *D01H 1/115* (2013.01); *B65H 2701/31* (2013.01)

(58) Field of Classification Search
CPC ..... H02P 8/24; H02P 8/36; H02P 8/38; D01H 1/20; D01H 4/42; D01H 13/14
See application file for complete search history.

(56) References Cited

U.S. PATENT DOCUMENTS

| | | | | |
|---|---|---|---|---|
| 2,425,576 A | * | 8/1947 | Thoma ..................... | D01H 5/68 15/301 |
| 3,962,855 A | * | 6/1976 | Stahlecker ............... | D01H 4/50 57/263 |
| 4,471,283 A | * | 9/1984 | Presley ..................... | H02P 8/12 318/685 |
| 4,673,139 A | * | 6/1987 | Memminger ........ | B65H 59/384 226/24 |
| 4,687,151 A | * | 8/1987 | Memminger .......... | B65H 57/20 242/128 |
| 5,170,953 A | * | 12/1992 | Stahlecker ........... | B65H 67/085 242/476 |
| 5,799,579 A | * | 9/1998 | Schlegel ............... | B41F 31/045 101/365 |

(Continued)

FOREIGN PATENT DOCUMENTS

| | | |
|---|---|---|
| DE | 33 35 924 A1 | 4/1985 |
| DE | 36 35 863 A1 | 5/1988 |

(Continued)

OTHER PUBLICATIONS

German Patent Office Search Report, dated Apr. 10, 2019.
EPO Search Report, dated Nov. 5, 2019.

*Primary Examiner* — Shaun R Hurley
*Assistant Examiner* — Patrick J. Lynch
(74) *Attorney, Agent, or Firm* — Dority & Manning, P.A.

(57) ABSTRACT

A textile machine and associated method are provided for operating the textile machine that includes a plurality of workstations, wherein each workstation includes at least one stepper motor configured to drive an element at the workstation. The method includes measuring a load variable, for example a load angle, of the stepper motor and detecting an approach of the element to an end position based on changes to the load variable.

16 Claims, 2 Drawing Sheets

(56) References Cited

U.S. PATENT DOCUMENTS

| | | | |
|---|---|---|---|
| 2009/0289141 A1* | 11/2009 | Griesshammer | B65H 54/36 242/484.6 |
| 2012/0053731 A1* | 3/2012 | Feldstein | E06B 9/70 700/275 |
| 2013/0221894 A1 | 8/2013 | Larsson et al. | |

FOREIGN PATENT DOCUMENTS

| | | |
|---|---|---|
| DE | 693 13 929 T2 | 1/1998 |
| DE | 197 01 883 A1 | 7/1998 |
| DE | 10 2005 002 409 A1 | 7/2006 |
| EP | 2 966 201 A2 | 1/1916 |
| WO | WO 98/42606 | 10/1998 |
| WO | WO 03/105332 A1 | 12/2003 |

* cited by examiner

METHOD FOR OPERATING A TEXTILE MACHINE, AND TEXTILE MACHINE

FIELD OF THE INVENTION

The invention relates to a method for operating a textile machine, in particular an open-end or air-jet spinning machine, wherein the textile machine has a plurality of workstations, which are at least partly driven by a single motor, wherein at least one stepper motor is assigned to a workstation. Moreover, the invention relates to a textile machine, in particular an open-end or air-jet spinning machine, with a plurality of workstations that are at least partly driven by a single motor, wherein at least one stepper motor is assigned to a workstation.

BACKGROUND

DE 10 2005 002 409 A1 describes a method and a device for determining the zero position of a thread guide—which is traversable with the aid of a stepper motor—of a winding device of a textile machine producing cross-wound packages. The thread guide is initially moved, with the aid of the stepper motor, in the direction of the zero position and is positioned, at a low speed, at a defined stop arranged behind the zero position in the travel direction. The stepper motor is then switched to a currentless state, whereby the rotor of the stepper motor drops into one of two possible detent positions. Thereafter, the stepper motor is activated, with the aid of a defined energization of its stator winding, in such a way that, when the stepper motor is switched off again, the rotor of the stepper motor stands in the detent position in which the thread guide is positioned in its zero position. This method is rather complicated due to the fact that the stepper motor must be switched to a currentless state twice before the thread guide is positioned in its zero position. In addition, when the stepper motor has been switched to a currentless state, it outputs no torque, which can also be disadvantageous.

A problem addressed by the present invention is therefore that of providing an improved method for controlling a stepper motor of a textile machine, as well as a textile machine utilizing such control of a stepper motor. Additional objects and advantages of the invention will be set forth in part in the following description, or may be obvious from the description, or may be learned through practice of the invention.

The objects are achieved with the aid of the features invention described herein.

The invention provides a method for operating a textile machine, which includes a plurality of workstations that are at least partly driven by a single motor. The workstations can therefore also be centrally driven, in part, although they must comprise at least one single-motor drive. The method can also be utilized on textile machines in which the workstations are completely driven by a single motor. At least one stepper motor, as a single-motor drive, is assigned to one workstation in this case. The method can be usable on various types of textile machines, in particular, however, on open-end or air-jet spinning machines. The non-limiting list of elements that can be driven by stepper motors includes: a yarn transfer device, a spin box opener, a yarn clearer, a multivalve, a traversing device, a thread laying device, and/or a suction nozzle.

According to the invention, a load variable of the stepper motor is measured. This load variable is, in particular, a load angle, although it can also be a variable, that is dependent thereon. In the case of a bipolar stepper motor, the load angle is defined as the angle between the rotor and the magnetic field generated by the coils. In the case of an n-pole stepper motor, the load angle is the n/2-fold of the angle between the rotor and the magnetic field generated by the coils. An approach by an element driven by the stepper motor to an end position is then detected via a change of the load variable, in particular an increase of the load angle. An approach is to be understood to be a first mechanical contact of the element driven by the stepper motor with a contact element assigned to the end position. The contact element can be, for example, a stop specifically configured for an end-position determination or an element to be measured, such as the surface of a package. Due to a contact of the element driven by the stepper motor with the contact element of the end position, the mechanical load of the stepper motor increases, and so its load variable changes, in particular the load angle increases. Due to this change of the load variable, or this increase of the load angle, the approach by the element driven by the stepper motor to the end position can be detected. This allows for a simple yet highly efficient control of the stepper motor.

In principle, it is possible to utilize an angle sensor, which determines the exact position of the rotor in order to determine the load variable, in particular the load angle. In particular, in the case of stepper motors having a large number of poles, a highly accurate and, therefore, expensive, angle sensor would be required in order to determine the load angle with good resolution. Advantageously, the load variable is therefore determined from voltages and/or currents measured at the stepper motor, in particular on the basis of a phase shift of a motor voltage with respect to a coil current. Voltages and currents can be measured, for example, with the aid of inexpensive and small semiconductor components. In the case of many stepper motors, such a measurement of voltages and/or currents has even been already integrated. The angle of the generated magnetic field is ascertained, for example, on the basis of the coil current. The angle of the rotor can be ascertained, for example, on the basis of the motor voltage. This is the case as a portion of the motor voltage comes from the voltage induced by the rotation of the rotor, i.e., the counter-EMF (electromotive force), and therefore indicates the angle of the rotor. The angle between the rotor and the magnetic field and, therefore, the load angle, can therefore be calculated on the basis of the phase shift between the motor voltage and the coil current. This is possible without additional mechanical elements, i.e., largely without wear of mechanical elements.

It is advantageous when switch signals of a chopper controller of the stepper motor are utilized for determining the load variable. These switch signals are already known with respect to the chopper controller. All that is required in order to determine the load variable or the load angle, therefore, is one more evaluation of the switch signals of the chopper controller.

It is advantageous when a rotation speed of the stepper motor is reduced and the stepper motor is brought to a stop and/or a phase current is increased upon detection of an approach to an end position, so that the load angle does not exceed 90°. The reduction of the rotation speed of the stepper motor is utilized, on the one hand, for ensuring that the collision of the element driven by the stepper motor with the contact element associated with the end position takes place slightly more slowly or in a manner that is not as hard. In addition, the end position can be reached more accurately and precisely by successively reducing the rotation speed. Finally, the stepper motor is brought to a stop, wherein this advantageously takes place before the stepper motor has lost steps. A loss of steps would, for example, adversely affect the counting of the steps up to the end position. The loss of steps can be additionally thwarted by increasing the phase current, so that the load angle does not exceed 90°. Since a loss of steps can occur only when the load angle exceeds 90°, a loss of steps is ruled out in advance in this way. In addition, the higher phase current brings about a higher torque, and so the element driven by the stepper motor can further approach the contact element associated with the end position.

Advantageously, the steps of the stepper motor are counted from a starting position, in particular up to the end position. The angle between the starting position and the present position or the end position can therefore be inferred from the known number of steps and the technical data of the stepper motor (number of steps per revolution). If the distance from the element driven by the stepper motor to the rotational axis of the stepper motor is also known, the distance covered by the element can be calculated.

In an advantageous enhanced embodiment of the invention, the starting position or the end position is located on a surface of a package. The respective other position, i.e., the end position or the starting position, is usually predefined by a fixed stop. In particular, the diameter of the package is determined by counting the steps of the stepper motor. Since the angle passed through or the distance covered by the element driven by the stepper motor is now known, the diameter of the package can be calculated on the basis of simple geometric relationships. The element driven by the stepper motor can be designed specifically for determining the diameter of the package. However, the element driven by the stepper motor can also be, for example, a suction nozzle which is likewise initially moved up to the surface of the package in order to find a thread end traveling on the package. In the latter case, the suction nozzle therefore also fulfills an extra task, namely determining the diameter of the package.

It is advantageous when the starting position is determined with the aid of an approach to an initial position on the basis of a change of the load variable, in particular an increase of the load angle. This takes place similarly to the above-described approach to the end position, with the advantages mentioned there.

It is also advantageous when an approximate end position is determined or is predefined and the rotation speed is reduced before the approximate end position is reached. A predefined end position is, for example, a fixed, unchanging stop in this case. An approximate end position, which must be determined first of all, is given, for example, when the end position is located on the surface of a package. The exact diameter of the package is often unknown until it is measured. An approximate value for the actual diameter of the package can be determined, however, from the most recently measured diameter of the package and the thread production that has taken place up to that point. If the rotation speed is now reduced before this approximate end position is reached, the collision of the element driven by the stepper motor with the contact element associated with the end position takes place more slowly and, therefore, on the one hand, in a manner which is not as hard and, on the other hand, more precisely.

Advantageously, the stepper motor is moved in reverse by a certain number of steps after the end position is reached. When the end position is reached, the element driven by the stepper motor presses against the contact element associated with the end position with a certain force. This pressure is often not required or is not even desirable, however. The pressure is not required, for example, when the movement of the stepper motor was utilized only for determining the end position. In that case, the task is satisfied when the end position is reached. Moving the stepper motor in reverse by a certain number of steps results in a lower current consumption of the stepper motor, since a pressing force no longer needs to be generated. In addition, this protects the element driven by the stepper motor and the contact element associated with the end position, since the aforementioned element and the aforementioned contact element no longer need to be pressed against one another. The reversal of the stepper motor can be advantageous in other cases as well, for example, when the element driven by the stepper motor is a suction nozzle for finding a thread end traveling on the package. In this case, it is generally not desirable, either, for the suction nozzle to be pressed onto the package surface with force, inter alia, so that the uppermost thread layers do not become damaged. Rather, the suction nozzle should be placed close to the package surface. This is precisely achieved, however, in that the stepper motor retracts the suction nozzle by a certain number of steps.

It is advantageous when an error is reported when the end position deviates from the approximate end position by more than a predetermined number of steps. The predetermined number of steps can differ depending on the element driven by the stepper motor and the nature of the initial position and the end position, but should take certain tolerances and uncertainties into account. If the end position should then deviate from the approximate end position by more than this predetermined number of steps, it must be assumed that an error has occurred. This can be, for example, an error during the control of the stepper motor or a foreign object that blocks the path of the element driven by the stepper motor. In any case, for the further proper operation of the workstation of the textile machine, it makes sense to report this error, for example, to a control unit, to a service robot, and/or to an operator.

Moreover, a textile machine, in particular an open-end or air-jet spinning machine, is provided, which comprises a plurality of workstations that are at least partly driven by a single motor. Of course, the workstations can also be completely driven by a single motor. At least one stepper motor is assigned to a workstation in this case.

According to the invention, the workstation includes a device for measuring a load variable of the stepper motor, in particular a load angle, as well as a controller that operates the stepper motor according to the description, above. Therefore, the load variable of the stepper motor is measured and an approach by the element driven by the stepper motor to an end position is detected on the basis of a change of the load variable, in particular an increase of the load angle. The control of the stepper motor is therefore simple yet also highly efficient.

The device for measuring the load variable of the stepper motor can encompass an angle sensor, which determines the exact position of the rotor of the stepper motor. This results in a highly complicated measurement of the load variable of the stepper motor, however. Therefore, it is advantageous when the device for measuring the load variable encompasses a current measuring device and/or a voltage measuring device, which are/is preferably assigned to an electronics system of the stepper motor. As described above, the angle between the rotor and the magnetic field and, therefore, the load angle, can be calculated with the aid of current and voltage measurements. Current measuring devices and voltage measuring devices, as semiconductor components, can be designed to be very small and inexpensive. They have even already been integrated into the stepper motor in a plurality of commercially available stepper motors. The structural and technical complexity for the current measuring devices and the voltage measuring devices is therefore very low.

Advantageously, the device for measuring the load variable, and the controller and/or a chopper controller of the stepper motor are connected to one another and/or form a unit. The measured load variable or the measured load angle can be an input for the control of the stepper motor, in particular when the load variable and the load angle change. Provided the stepper motor is controlled with the aid of the chopper controller, the control of the stepper motor acts directly on the chopper controller. The data of the chopper controller, for their part, can also be utilized again for the measurement of the load variable, however. Logically, the device for measuring the load variable, the controller, and the chopper controller therefore belong together. In this regard, it is advantageous when they are connected to one another, so that the exchange of data and/or control commands functions. With respect to the space required, it is advantageous when two or all three of the aforementioned elements form a unit. Separate housings for the individual elements as well as connectors are therefore dispensed with, since fixed connections can then be configured within the unit.

It is advantageous when the controller is designed for determining a phase current of the stepper motor, for determining a rotation speed of the stepper motor, and/or for counting steps of the stepper motor. The torque of the stepper motor is affected by the phase current. If, for example, an approach to an end position is then detected, the torque can be increased by increasing the phase current, which also prevents a loss of steps of the stepper motor. When the rotation speed can be established, the rotation speed can be reduced when an approach to an end position is detected, so that the collision of an element driven by the stepper motor with a contact element associated with the end position takes place slightly more slowly or in a manner that is not as hard. If the steps of the stepper motor are counted, the angle passed through by the driven element or the distance covered by the driven element can then be determined from the number of steps between a starting position and the present position or the end position of the element driven by the stepper motor. The angle passed through between the starting position and the end position can be utilized, for example, for measuring a variable end position, which is the case, for example, with the surface of a package. The angle passed through between the starting position and the present position can also be utilized for controlling the stepper motor, for example, when the stepper motor must stop and/or reverse direction at a certain position.

Advantageously, the stepper motor is designed for driving a yarn transfer device, a spin box opener, a yarn clearer, a multivalve, a traversing device, a thread laying device, and/or a suction nozzle. A yarn clearer is a sensor that monitors the yarn quality and can be moved along with the yarn in the case of a traversing movement of the yarn. A multivalve is a yarn store, for example, a screen store, which is to accommodate the yarn during the thread seeking. In the case of all aforementioned devices, it is advantageous when an approach by the element driven by the stepper motor to an end position is detected. In the case of other devices as well, it can be possible and meaningful, however, to utilize a stepper motor according to the invention for driving the device; the list provided above is therefore not conclusive.

BRIEF DESCRIPTION OF THE DRAWINGS

Further advantages of the invention are described in the following exemplary embodiments. Wherein.

DETAILED DESCRIPTION

Figure 1:
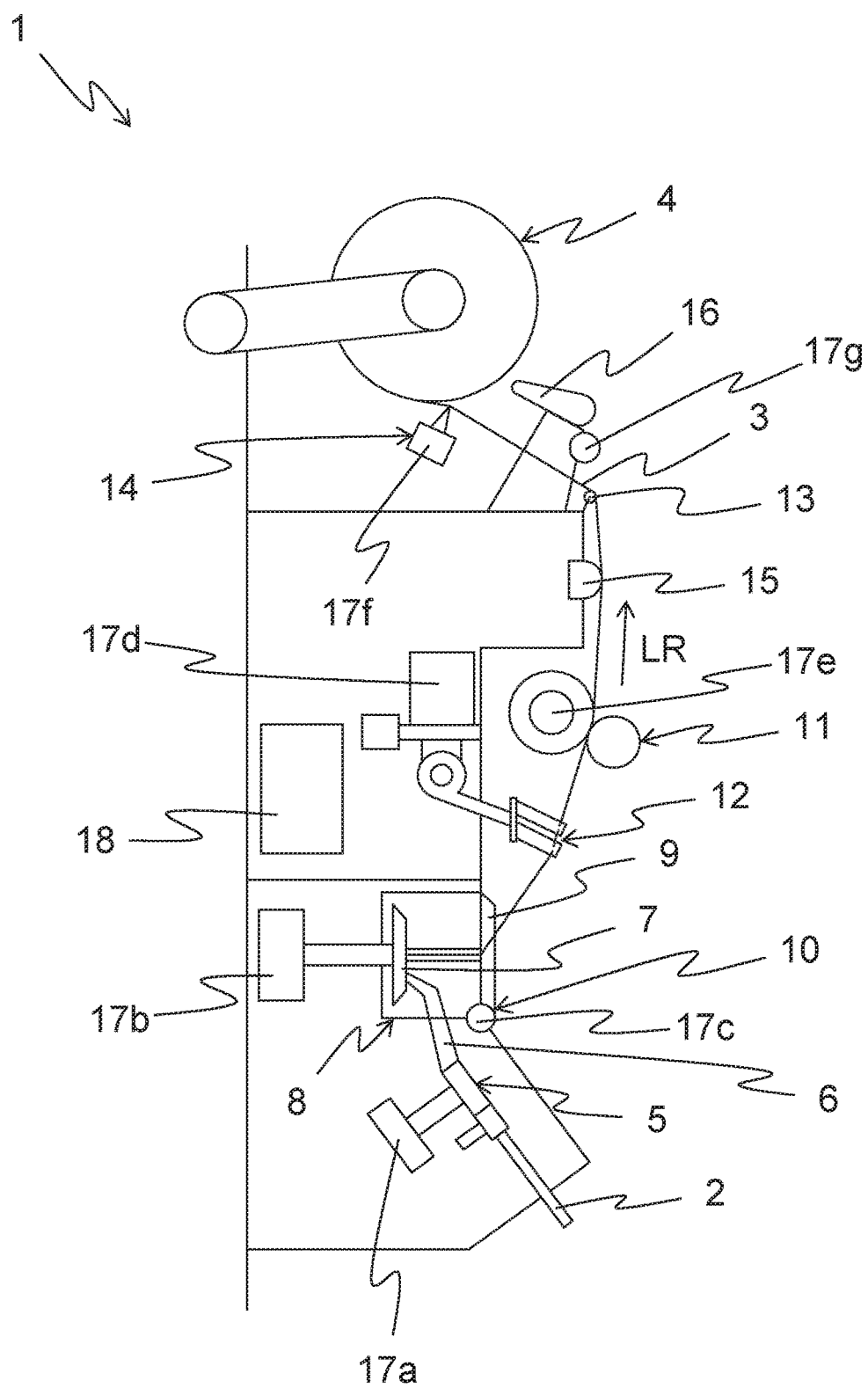
FIG. 1 shows a schematic side view of a workstation.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic side view of a workstation 1 of a textile machine. The textile machine can encompass a plurality of workstations 1 in order to increase a productivity of the textile machine in accordance with the number of workstations 1. In the present exemplary embodiment, the workstation 1 is designed as a spinning position of a rotor spinning machine. The invention can be utilized, however, in principle, on any type of textile machine, in particular on other open-end spinning machines, air-jet spinning machines, or, for example, winders.

The workstation 1 produces a thread 3 from a sliver 2. The thread 3 passes through the workstation 1 in a delivery direction LR and is ultimately wound onto a package 4.

First of all, however, the sliver 2 is opened into its individual fibers 6 in an opening unit 5. The individual fibers 6 are guided to a spinning rotor 7, which produces the thread 3 from the individual fibers 6. In the present exemplary embodiment, the spinning rotor 7 is arranged in a spin box 8, which is closed by a spin box cover 9. The spin box cover 9 can be opened by a spin box opener 10, so that access to the spin box 8 is provided. The thread 3 formed by the spinning rotor 7 is drawn from the spinning rotor 7 out of the spin box 8 with the aid of a pair of delivery rollers 11, wherein the thread 3 can also pass through a first traversing device 12 which traverses the thread 3. Downstream from the pair of delivery rollers 11 in the delivery direction LR, the workstation 1 comprises a diverting unit 13, which diverts the thread 3 to a second traversing device 14. This second traversing unit 14 traverses the thread 3 laterally with respect to the delivery direction LR in such a way that the thread 3 is wound onto the package 4 in the desired way, in particular in a crosswise winding.

In the present exemplary embodiment, a thread monitor 15 is arranged between the pair of delivery rollers 11 and the diverting unit 13, with the aid of which a presence of the thread 3 can be monitored. In addition, a linearly displaceable suction nozzle 16 is provided, which can find and draw in a thread end traveling on the package 4, for example, after a thread break. Instead of being linearly displaceable, the suction nozzle 16 can also be designed, for example, to be pivotable or rotatable.

Moreover, the workstation 1 comprises a plurality of single-motor drives in the form of stepper motors 17a-17g. The individual stepper motors 17a-17g are shown here by way of example. It is also possible that central drives are provided in place of a few of these stepper motors 17a-17g.

It is essential to the invention that at least one drive is designed as a stepper motor 17a-17g. In addition, the workstation 1 can also comprise further stepper motors, for example, for driving devices not shown here, such as a yarn transfer device, a yarn clearer, a multivalve, and/or a thread laying device. The stepper motors 17a-17g of the present exemplary embodiment are assigned to the opening unit 5 (stepper motor 17a), the spinning rotor 7 (17b), the spin box opener 10 (17c), the first traversing device 12 (17d), the pair of delivery rollers 11 (17e), the second traversing device 14 (17f), and the suction nozzle 16 (17g). The aforementioned devices can therefore be driven individually, independently of one another, and independently of the corresponding devices of other workstations 1 with the aid of the assigned stepper motors 17a-17g.

In addition, the workstation 1 comprises a controller 18 that is connected to at least one of the stepper motors 17a-17g with the aid of a connection (not shown here), in order to control the stepper motor and, as a result, to carry out the process of producing the thread 3.

According to the invention, a load variable of at least one of the stepper motors 17a-17g is measured. In particular, the load variable is a load angle. If the element driven by the stepper motor 17a-17g now approaches an end position, a change of the load variable, in particular, an increase of the load angle, is detected. Two possible methods for controlling stepper motors 17a-17g are explained in greater detail in the following figures.

Figure 2A:
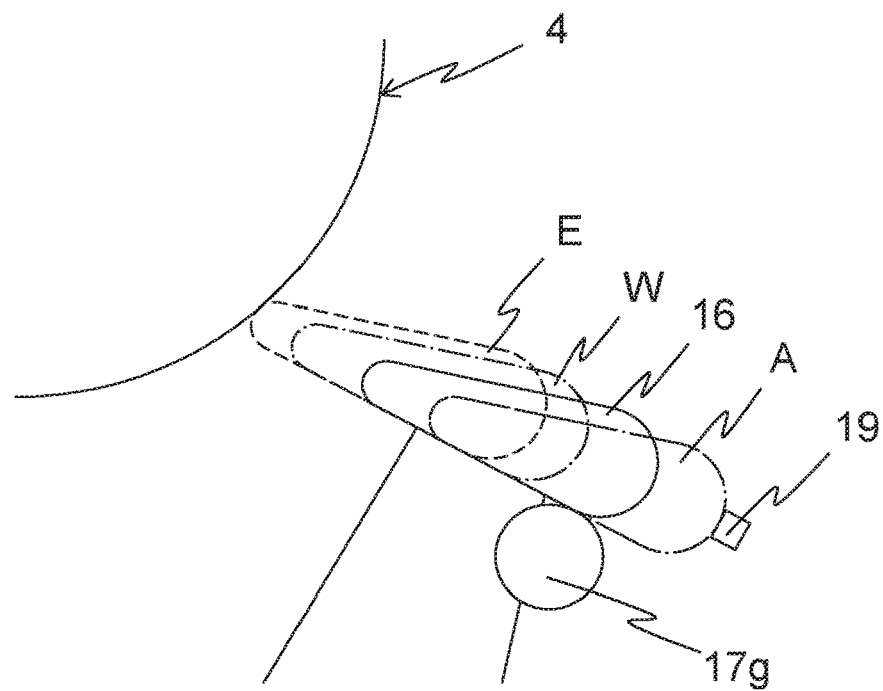
FIG. 2a shows a schematic side view of a suction nozzle.

FIG. 2a shows a schematic side view of a suction nozzle 16. With the aid of the suction nozzle 16, a thread end traveling on a package 4 can be drawn in and, therefore, found and further treated. The suction nozzle 16 is linearly displaceable and is driven by a stepper motor 17g, for example, with the aid of a pinion and a toothed bar (which are not shown, for the sake of clarity).

During the normal spinning and winding operation, the suction nozzle 16 is not required and is located in a starting position A, which is defined by a stop 19. If a thread end is now traveling on the package 4, for example, after a thread break, the stepper motor 17g displaces the opening of the suction nozzle 16 in the direction of the surface of the package 4. When the opening of the suction nozzle 16 touches the surface of the package, it has reached its end position E. For this purpose, the stepper motor 17g initially displaces the suction nozzle 16 at a high speed. The closer the opening of the suction nozzle 16 comes to the surface of the package 4, the more slowly the stepper motor 17g moves the suction nozzle 16. The proximity of the opening of the suction nozzle 16 to the surface of the package 4 is approximately calculated. The exact position of the end position E is determined only when the suction nozzle 16 is in contact with the surface of the package 4. The known geometry of the suction nozzle 16 and the starting position A with respect to the package 4 are utilized for the approximate calculation. The package diameter can be approximately determined from the known amount of produced thread located on the package. If the steps of the stepper motor 17g, which the suction nozzle 16 has taken from the starting position A, are now counted, the approximate distance of the opening of the suction nozzle 16 from the surface of the package 4 can be calculated.

In the proximity of the surface of the package 4, the suction nozzle 16 is therefore moved slowly toward the package 4. If the opening of the suction nozzle 16 now comes into contact with the surface of the package 4, a load variable of the stepper motor 17g changes, in particular, a load angle of the stepper motor 17g increases. If such an increase of the load angle is detected, the stepper motor 17g further reduces the speed of the suction nozzle 16. Simultaneously, a phase current of the stepper motor 17g is increased, so that the stepper motor 17g does not lose any steps.

If the load angle increases further, the stepper motor 17g is completely stopped. The opening of the suction nozzle 16 has now reached its end position E. On the basis of the steps of the stepper motor 17g counted from the starting position A to the end position E, the exact position of the suction nozzle 16 can now be determined and, on the basis thereof, the diameter of the package 4 can be calculated. The diameter of the package 4, which is now known, can be utilized as the basis for the next estimation of the diameter of the package 4.

The opening of the suction nozzle 16 must be located close to the surface of the package 4 in order to seek the thread end traveling on the surface of the package 4. If the suction nozzle 16 is in its end position E, the suction nozzle 16 presses onto the surface of the package 4 and the upper thread layers on the package 4 would become damaged during the rotation of the package 4, which is necessary in order to find the thread end. Therefore, the suction nozzle 16 is retracted, by a pair of steps of the stepper motor 17g, into a working position W. The number of steps by which the suction nozzle 16 is retracted is predetermined.

If the suction nozzle 16 has then found the thread end and, for example, has transferred the thread end to a thread catcher, the stepper motor 17g moves the suction nozzle 16 back into its starting position A. For this purpose, the speed of the stepper motor 17g is reduced and the phase current is increased, as described above with respect to the approach to the end position E.

The steps of the stepper motor 17g are also counted during the return to the starting position A. The starting position A, which has now been reached again, should coincide with the previous position of the starting position A within a very narrow tolerance. If this is not the case, an error is reported to the controller 8. One possible cause for such an error could be a contamination of the movable parts of the suction nozzle 16, which blocks the suction nozzle 16 and does not allow the suction nozzle 16 to return to its starting position A.

Figure 2B:
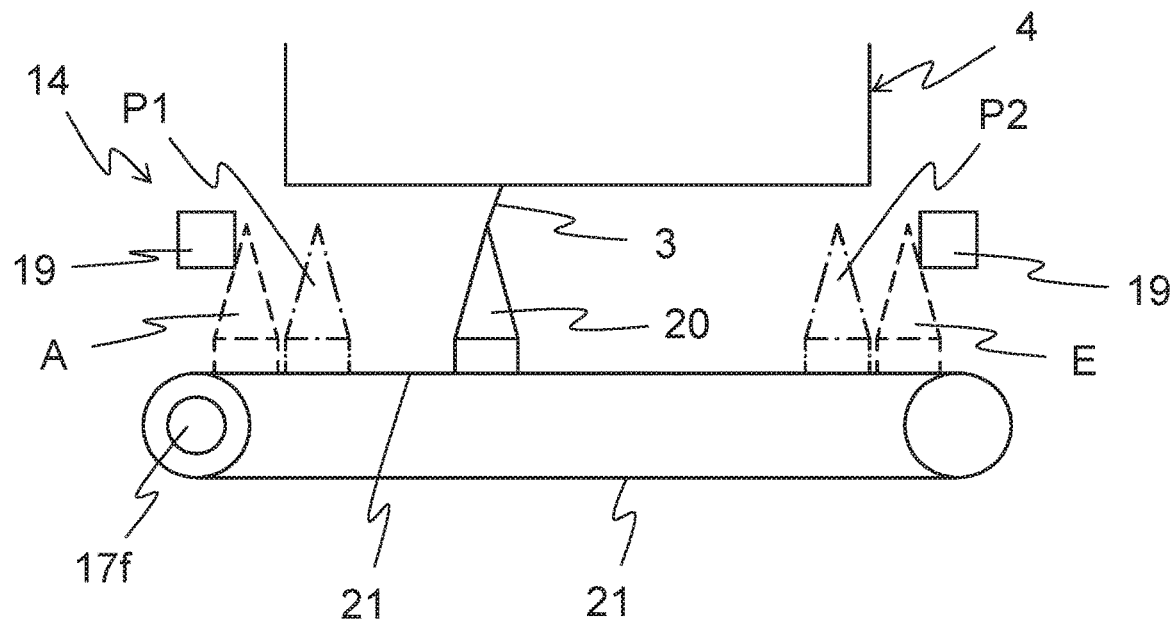
FIG. 2b shows a schematic front view of a traversing device.

FIG. 2b shows a front view of a traversing device 14. The traversing device 14 moves the thread 3 back and forth and therefore lays the thread 3 on the package 4, for example, in a crosswise winding. A traverse guide 20 of the traversing device 14 is mounted on a drive belt 21, which is driven by a stepper motor 17f. In order to correctly lay the thread 3 on the package 4, the traverse guide 20 is moved from a first position P1 to a second position P2 and back. The positions P1 and P2 are determined by counting the steps of the stepper motor 17f.

Since it cannot be ruled out that the location of the positions P1 and P2 changes minimally after some time—whether this is due to lost steps of the stepper motor 17f, due to an elongation or shrinkage of the drive belt 21 due to temperature changes, or due to other reasons—the positions P1 and P2 are regularly adjusted, for example, when the package 4 is replaced, or in the case of a thread break. In order to adjust the positions P1 and P2, a starting position A as well as an end position E are predefined. The starting position A and the end position E are defined by stops 19. Initially, the stepper motor 17f moves the traverse guide 20 to the starting position A. The speed of the stepper motor 17f is reduced already before the—calculated—attainment of the starting position A. If the traverse guide 20 now comes into contact with the stop 19, this approach is detected on the basis of a change of a load variable of the stepper motor 17*f*, in particular an increase of the load angle. Thereupon, the speed of the stepper motor 17*f* is further reduced and the stepper motor 17*f* is then brought to a stop. Simultaneously, the phase current of the stepper motor 17*f* is increased in order to hold the load angle under 90° and to not lose any steps. The traverse guide 20 is now moved to the end position E, wherein the attainment of the end position E takes place in the same manner as described with respect to the starting position A. The steps of the stepper motor 17*f* between the starting position A and the end position E are counted. The positions P1 and P2 are established with respect to the starting position A and the end position E, for example, at 10% and 90%, respectively, of the distance between the starting position A and the end position E. These values are multiplied by the number of steps that were counted, and so the positions P1 and P2 can be reached again by counting the steps.

The present invention is not limited to the represented and described exemplary embodiments. Modifications within the scope of the claims are also possible, as is any combination of the features, even if they are represented and described in different exemplary embodiments.

LIST OF REFERENCE CHARACTERS 1 workstation
2 sliver
3 thread
4 package
5 opening unit
6 fibers
7 spinning rotor
8 spin box
9 spin box cover
10 spin box opener
11 pair of delivery rollers
12 first traversing device
13 diverting unit
14 second traversing device
15 thread monitor
16 suction nozzle
17 stepper motor
18 controller
19 stop
20 traverse guide
21 drive belt
A starting position
E end position
LR delivery direction
P1 first position
P2 second position
W working position

The invention claimed is:

1. A method for operating a textile machine that includes a plurality of workstations, wherein each workstation comprises at least one stepper motor configured to drive an element at the workstation, the method comprising: measuring a load variable of the stepper motor;
    detecting an approach of the element to an end position based on changes to the load variable;
    the textile machine producing a package; and
    further comprising determining a diameter of the package by counting steps of the stepper motor.

2. The method as in claim 1, wherein the load variable comprises a load angle, the load angle determined from voltages or currents measured at the stepper motor.

3. The method as in claim 1, wherein the load variable is determined from switch signals of a chopper controller configured with the stepper motor.

4. The method as in claim 1, wherein upon detection of the approach of the element to the end position, a rotation speed of the stepper motor is reduced and the stepper motor is brought to a stop.

5. The method as in claim 4, wherein the load variable is a load angle, further comprising increasing phase current of the stepper motor so that the load angle does not exceed 90°.

6. The method as in claim 1, wherein the steps of the stepper motor are counted from a starting position to the end position.

7. The method as in claim 6, wherein the textile machine is one of an open-end or air-jet spinning machine, and at least one of the starting position and the end position is located on a surface of a package.

8. The method as in claim 4, wherein a starting position is determined with aid of an approach to an initial position based on changes to the load variable.

9. The method as in claim 4, wherein an approximation of the end position is determined or is predefined and the rotation speed of the stepper motor is reduced before the approximated end position is reached by the element.

10. The method as in claim 9, wherein the stepper motor is moved in reverse by a certain number of steps after the end position is reached by the element.

11. The method as in claim 9, wherein an error is generated when the end position deviates from the approximated end position by more than a predetermined number of steps.

12. A textile machine that produces a package, comprising:
    a plurality of workstations;
    at least one stepper motor at each workstation configured to drive an element at the workstation;
    a measuring device at the workstation configured to measure a load variable of the stepper motor;
    a controller in communication with the measuring device, the controller configured to detect an approach of the element to an end position based on changes to the load variable; and
    the controller further configured to determine a diameter of the package by counting steps of the stepper motor.

13. The textile machine as in claim 12, wherein the load variable is a load angle, the measuring device comprising one or both of a current measuring device and a voltage measuring device configured with an electric drive of the stepper motor.

14. The textile machine as in claim 12, wherein the measuring device and the controller are combined in a single unit.

15. The textile machine as in claim 12, wherein the controller is configured for one or both of: determining a phase current of the stepper motor, and determining a rotation speed of the stepper motor.

16. The textile machine as in claim 12, wherein the element driven by the stepper motor comprises a suction nozzle.

* * * * *